(12) United States Patent
Braud et al.

(10) Patent No.: US 10,846,272 B2
(45) Date of Patent: Nov. 24, 2020

(54) METADATA MODEL FOR SUPPORTING CUSTOMIZATIONS OF A DATABASE SCHEMA

(71) Applicant: Microsoft Technology Licensing, LLC, Redmond, WA (US)

(72) Inventors: Luke Braud, Truckee, CA (US); Lu Jiang, Sunnyvale, CA (US); Derek E. Lyons, El Cerrito, CA (US); Christian Marenbach, San Francisco, CA (US); Baran Salih Nohutcuoglu, San Francisco, CA (US); Vikram H. Patil, Belmont, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 217 days.

(21) Appl. No.: 15/853,560

(22) Filed: Dec. 22, 2017

(65) Prior Publication Data
US 2019/0197137 A1 Jun. 27, 2019

(51) Int. Cl.
*G06F 17/00* (2019.01)
*G06F 16/21* (2019.01)
*G06F 16/248* (2019.01)
*G06F 16/25* (2019.01)
*G06F 16/2457* (2019.01)

(52) U.S. Cl.
CPC .......... *G06F 16/211* (2019.01); *G06F 16/248* (2019.01); *G06F 16/2457* (2019.01); *G06F 16/252* (2019.01)

(58) Field of Classification Search
CPC .... G06F 16/27; G06F 16/9024; G06F 16/211; G06F 16/214; G06F 16/284; G06F 16/289
See application file for complete search history.

(56) References Cited

U.S. PATENT DOCUMENTS 9,600,500 B1 * 3/2017 Gupta ................ G06F 11/1471
2019/0199594 A1 * 6/2019 Chiocchi ................ H04L 41/12

* cited by examiner

*Primary Examiner* — Truong V Vo
(74) *Attorney, Agent, or Firm* — Hickman Palermo Becker Bingham LLP; Christine E. Orich

(57) ABSTRACT

Technologies for supporting customizations of a database schema are disclosed. In an embodiment, an application programming interface includes an aliasing component and a mapping component, which cooperate to constrain modifications to front-end software to the aliasing component and to constrain modifications to back-end database schema to the mapping component.

20 Claims, 6 Drawing Sheets

Opportunities

| # | Target | Contact | Product | Competitor |
|---|---|---|---|---|
| 1 | ABC Co. | Person A | Product 101 | C1 Co. |
| 2 | XYX Inc. | Person B | Product 102 | C2 Co. |
| 3 | ZZZ Ltd. | Person C | Product 101 | C1 Co. |
| 4 | A1A Co. | Person D | Product 102 | C2 Co. |
| 5 | DEF Inc. | Person E | Product 201 | C3 Co. |
| 6 | JKL Co. | Person F | Product 201 | C3 Co. |
| 7 | MNO Inc. | Person Z | Product 301 | C4 Co. |

410: *C1 just launched a new version of X* Details

METADATA MODEL FOR SUPPORTING CUSTOMIZATIONS OF A DATABASE SCHEMA

TECHNICAL FIELD

The present disclosure relates to the technical field of software integration, and more particularly to techniques for supporting customizations of a back-end database schema in a front-end software application.

BACKGROUND

In software engineering, a metadata model can be used to describe the structure and organization of data that is stored in a database system. Portions of the metadata model and the associated data can be exposed for use and manipulation by software applications through application programming interfaces (APIs). For example, APIs enable front-end software applications to programmatically access, read, write, and query data stored in a back-end database system in accordance with the metadata model.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4B is a screen capture of an example of a modification of the user interface of FIG. 4A to include an additional feature, in an embodiment;

DETAILED DESCRIPTION

Figure 1:
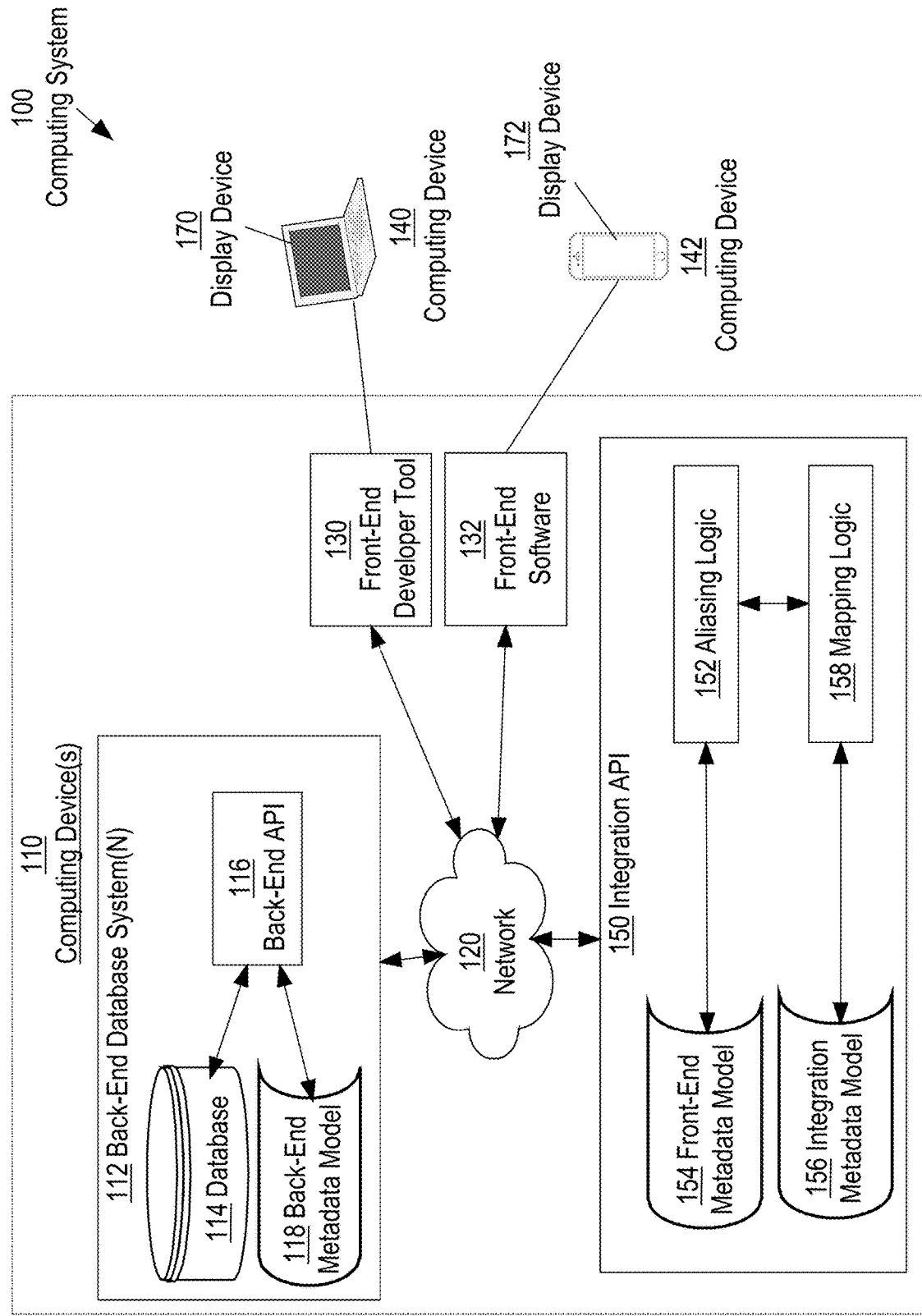
FIG. 1 is a block diagram that depicts an example system for enabling data communications between a front-end software application and a back-end database system, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Computer software products, such as database applications, can be deployed over a network using a service model ("Software as a Service") (SaaS) in which portions of a database system are made available or "exposed" through publication on the network of application programming interfaces (APIs). A particular application software product can be created by adding or modifying functionality that is exposed by the published APIs to create a set of new, product-specific versions of the published APIs. Individual implementations of a particular application software product can be adapted to incorporate implementation-specific features ("customizations") by further modifying the published APIs and/or the product-specific APIs.

The published APIs are often bound to a back-end database system according to the schema used by the particular database. Thus, software products that incorporate the published APIs are not typically portable, without extensive modifications, to other database systems that are constructed based on different schema.

The published APIs and product-specific APIs can be adapted over time based on changes in and additions to domain-specific knowledge, for example. However, these API changes can have a "ripple effect" as there is often a need to propagate the changes to other layers of the software stack (for example, to computer programs in the database system and programming code in the user interface). In addition, any implementation-specific changes that have been made to local instances of the APIs would need to be incorporated into newer versions of the published APIs and/or product-specific APIs that are made available by the software vendors or developers.

The known prior approaches do not allow for both application-specific API modifications (which may be based on customizations of the underlying database schema and/or updates to the application software) and interoperability across database systems that use different schemas.

The disclosed technology includes an "integration" API layer, which includes a combination of metadata and data that is defined with "just enough" complexity to meet the needs of application software products and provide compatibility across database schemas. The integration API layer includes an aliasing layer and a mapping layer. In an embodiment, the aliasing layer enables APIs to be adapted to support new application features and customizations without affecting any of the layers below the aliasing layer in the software stack, and the mapping layer enables APIs to be extended to support multiple different database schemas without affecting any of the layers above the mapping layer in the software stack.

Additionally, the disclosed aliasing layer protects against errors that may be introduced due to inconsistencies or "collisions" between new application features (such as the addition of a new domain concept) that may be rolled out by the software developer or vendor and customizations (such as different expressions of a concept already in existence) that may have been added to an implementation-specific version of the software product. It should be noted for clarity that as used herein, "aliasing" may refer to a process of associating an alternative (rather than additional) name to an item of metadata. In other words, multiple different labels may exist in different metadata models, and aliasing may include a process of making associations between the different labels in the different metadata models.

The disclosed approaches can improve extensibility of a software product across different database systems while reducing the complexity, time, and expense of software development. For example, separation of the aliasing layer from the integration layer allows application functionality to be managed and extended in a "surgical" fashion, in that the modifications are constrained to only those specific portions of the software stack that relate to the changes that are introduced.

In this way, embodiments of the disclosed technologies can allow seamless data communications between a front-end software application and multiple different back-end database systems even when modifications to the back-end database schema or the front-end software are made post-implementation. For example, when a back-end database schema is changed, the changes can be made available to the front-end application by a straightforward modification to a mapping layer of an intermediate ("integration") API with no need for re-coding in the front-end software. Similarly, when a modification (such as a new feature) that references a portion of the back-end schema is implemented in the front-end system, the modification can be automatically back-propagated to previously-created instances of references to that portion of the back-end schema by updating an aliasing layer of the intermediate API, with no need for re-coding in the back-end system.

Approaches described herein address the technical problem of forward and backward propagation of post-implementation front-end software modifications and customizations of back-end database schema. As described in more detail below, the disclosed approaches improve upon known systems by, among other things, providing an intermediate, "integration" API in which an aliasing layer is effectively decoupled from a mapping layer in order to constrain modifications to the affected layer. "Layer" as used herein may refer to a discrete functional component of computer programming.

Using aspects of the disclosed approaches, the robustness of both front-end software applications and back-end database systems can be improved, thereby reducing errors in data communication and accelerating new feature deployment.

System Overview

Front-end software applications are often used to create, display, search for, retrieve, and modify data that is stored in a searchable database of a back-end system, where the front-end software application and the back-end system communicate with each other over a network. Examples of front-end software applications include commercially available spreadsheet programs, data analytics tools, activity planning software, project management and calendaring systems, business tools such as SALESNAVIGATOR, available from LinkedIn Corporation of Sunnyvale, Calif., connection networks such as LINKEDIN, available from LinkedIn Corporation. Examples of back-end database systems include customer relationship management (CRM) systems, enterprise resource planning (ERP) systems, financial systems, human resources systems, recruiting and job-hunting systems, healthcare systems, health insurance systems.

A database schema as used herein may refer to a physical design of a database system as exposed through an API, and may include field and table names, relationships between various tables and fields, and rules that apply to the various tables and fields, such as the data type, maximum length, default data values. Terminology such as table, field, and record may be used herein for discussion purposes, but it should be understood that this disclosure is not limited in application to any particular schema or database design paradigm. Relational databases, hierarchical databases, object-oriented databases, graph databases are some of the types of database systems to which the technologies described herein may apply. For example, elements of a database schema (as perceived through the API) may be referred to as objects, fields, and relationships in one implementation, and may be referred to as entities and properties in another implementation.

A metadata model as used herein may refer to a conceptual representation of a database schema, which is implemented programmatically in a computer system. A metadata model may include labels that are to be used by computer code to refer (directly or indirectly) to database tables and fields, relationships between different tables and fields through the use of pointers, and logic for enforcing rules that are associated with tables and fields. Portions of a metadata model may be implemented using, for example, a JavaScript Object Notation (JSON) file or an eXtensible Language (XML) file. In some implementations, a metadata model may represent only a subset of all of the tables and fields in the database schema. For example, a particular metadata model may be designed for a specific domain (such as healthcare, sales, recruiting) or a specific type of software application (for example, a data visualization package or a calendaring system).

FIG. 1 is a block diagram that depicts an example computing system 100 arranged to operate an integration API 150, a front-end developer tool 130, and a front-end software application 132, to enable the front-end software application 132 to communicate with one or more back-end database systems "N" (where N is a positive integer) 112, in an embodiment. Computing system 100 includes computing device(s) 110, computing devices 140, 142, and display devices 170, 172, which are communicatively coupled to an electronic communications network 120.

Implemented in the devices 110, 140, 142, 170, 172 using computer software, hardware, or software and hardware, are processor-executable instructions, data structures, and digital data, stored in memory, which cooperate to provide the computer-implemented functionality described herein. For ease of discussion, these computer-implemented components are represented schematically in FIG. 1 as back-end database system 112 (which includes one or more databases 114, one or more back-end APIs 116, one or more back-end metadata models 118), front-end developer tool 130, front-end software application 132, and integration API 150. As shown, integration API 150 includes aliasing logic 152, front-end metadata model 154, integration metadata model 156, and mapping logic 158. In some implementations, front-end metadata model 154 may be included in front-end application software 132.

"System" as used herein may refer to a single computer or network of computers and/or other devices. "Computing device" as used herein may refer to a computer or any other electronic device that is equipped with a processor. Although computing system 100 may be implemented with any number of back-end database system 112 (including database 114, back-end API 116, back-end metadata model 118), front-end developer tool 130, front-end software application 132, integration API 150 (including aliasing logic 152, front-end metadata model 154, integration metadata model 156, and mapping logic 158), computing device(s) 110, display devices 170, 172 and computing devices 140, 142, respectively, in this disclosure, these elements may be referred to in the singular form for ease of discussion.

Back-end database system 112 (including database 114, back-end API 116, back-end metadata model), front-end developer tool 130, front-end software application 132, integration API 150 (including aliasing logic 152, front-end metadata model 154, integration metadata model 156, and mapping logic 158) are shown as separate elements in FIG. 1 for ease of discussion, but the illustration is not meant to imply that separation of these elements is required. The illustrated components (or their functionality) may be divided over any number of physical systems, including a single physical computer system, and can communicate with each other in any appropriate manner. A dashed line is used to illustrate that the connection between back-end API 116 and database 114 may be direct or indirect (for example, through another layer of software abstraction).

Front-end developer tool 130 and front-end software application 132 enable access to different portions of the functionality of computing system 100, by computing devices 140, 142. Front-end developer tool 130 includes software that may be used to create front-end software 132, such as a graphical user interface-based tool for writing, modifying, and testing computer code that utilizes portions of back-end API 116 and/or integration API 150 to access data in or write data to database 114.

In an embodiment, front-end software 132 can be used to configure integration metadata model 156. Alternatively, or in addition, front-end software application 132 facilitates viewing, querying of data stored in database 114 and/or writing data input via front-end software application 132 to database 114, using portions of back-end API 116 and/or integration API 150.

Portions of the illustrative front-end application software 132 and/or integration API 150 may be implemented as web-based or mobile app-based software components and may be hosted by a hosting service (not shown). In an embodiment, portions of each of front-end developer tool 130 and front-end software application 132 are implemented in a web browser or mobile application that can execute locally, for example on computing devices 140, 142, respectively.

In some embodiments, each of computing devices 140, 142 is a client-side computing device or set of cooperating computing devices, such as a smart phone, tablet computer, wearable or body-mounted device, smart appliance, laptop machine, or combination of any of such devices, and computing device(s) 110 is/are a server-side computing device such as a server computer or network of server computers accessible by the Internet, for example in a public or private cloud. As illustrated in FIG. 1, each of display devices 170, 172 is implemented in a computing device 140, 142, respectively, however any of display devices 170, 172 may be implemented as a separate device or as part of another device, or as multiple networked display devices, in other implementations.

Back-end database system 112 includes a database system (such as a customer relationship management or CRM database system) that stores and manages transaction-related information about entities. Such entities may include sales prospects to which sales of one or more products or services are desired or intended to be made. Such transaction-related entity information is stored in database 114, which is implemented as a searchable database system, such as a graph-based database system or a table-based relational database system or a hierarchical database system, for example. The stored transaction information may include numerous data records, where each data record may indicate, for example, a person or entity name, an address, a phone number, an email address, an IM (instant messaging) address, a web address, an employer name, a job title, an activity log.

Database 114 can be searched by computing system 100 programmatically, using a query language (using query semantics provided by back-end API 116, such as the structured query language or SQL, or a particular version of SQL) to retrieve data that may be relevant to a particular feature of front-end software application 132. Searching of database 114 can be performed by query functionality of front-end software 132 cooperating with integration API 150, which makes use of portions of front-end metadata model 154 and integration metadata model 156, as described in more detail below.

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired and wireless networks, as needed to enable communications between the computing device(s) 110, 140, 142.

Computing device 140 operates front-end developer tool 130 to establish logical connection(s) over network 120 with back-end database system 112, either through back-end API 116 or via integration API 150. Front-end developer tool 130 can be used to add new features to or modify portions of the front-end software application 132 and/or to create or modify portions of integration API 150. For example, front-end developer tool 130 cooperates with API 150 to make modifications to front-end metadata model 154 or integration metadata model 156. Alternatively, or in addition, portions of front-end developer tool 130 can cooperate with back-end API 116 to modify back-end metadata model 118.

When front-end developer tool 130 and/or front-end software 132 are configured to access back-end database system 112 via integration API 150 (instead of directly via back-end API 116), this arrangement can facilitate use of integration API 150 to support a new back-end system 112 (such as a back-end system 112 that is designed according to a different database schema), such that only the implementation of integration API 150 (and not front-end developer tool 130 or front-end software 132) needs to be changed in order to support the new back-end system 112.

Computing device 142 operates front-end software application 132 to establish logical connection(s) over network 120 with portions of back-end database system 112 at the data layer or the meta data layer, for example, through back-end API 116, or through integration API 150. Front-end software application 132 may write data to database 114, read data from database 114, execute queries on database 114, using integration API 150 as needed. Data retrieved from database 114 may be displayed in a view generated by front-end software application.

Figure 4A:
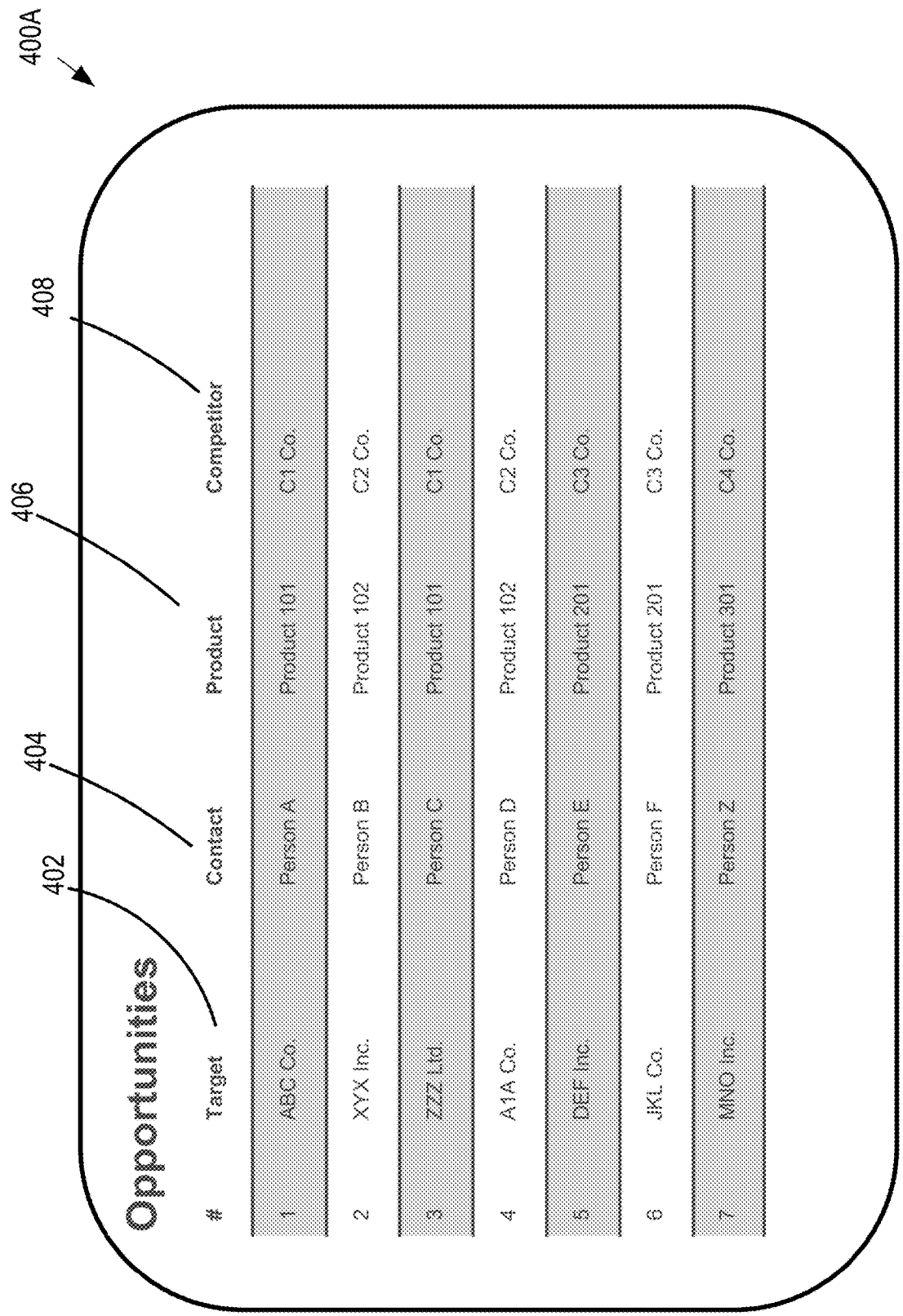
FIG. 4A is a screen capture of an example user interface of a front-end software application, which displays data retrieved from one or more back-end database systems, in an embodiment.

Examples of views that may be displayed by front-end software application 132 on display device 172 are shown in FIG. 4A and FIG. 4B, described below. A view as used herein may refer to a window of a graphical user interface (GUI), or a portion of a window, such as a text display box, an image, a graphical element, or any combination of GUI elements.

Components of integration API 150 operate to facilitate communication between front-end software 132 and back-end database system 112. Mapping logic 158 accesses database 114 and back-end metadata model 118 via portions of back-end API. Mapping logic 158 performs a transformation of data retrieved from database 114 and portions of back-end metadata model 118 and creates or updates integration metadata model 156.

Integration metadata model 156 functions as an intermediate metadata model that facilitates interoperability with multiple heterogeneous back-end database systems 112 and facilitates the introduction of changes to the database schema as represented by back-end metadata model 118 without impacting front-end software 132.

Aliasing logic 152 enables transformation of the integration metadata model 156 for use by front-end software 132. When portions of integration metadata model 156 represent domain-independent or generic concepts, aliasing logic 152 can be used to provide domain-specific labels, relationships, and rules for data created, accessed, or used by front-end software 132.

Process Overview

Figure 2:
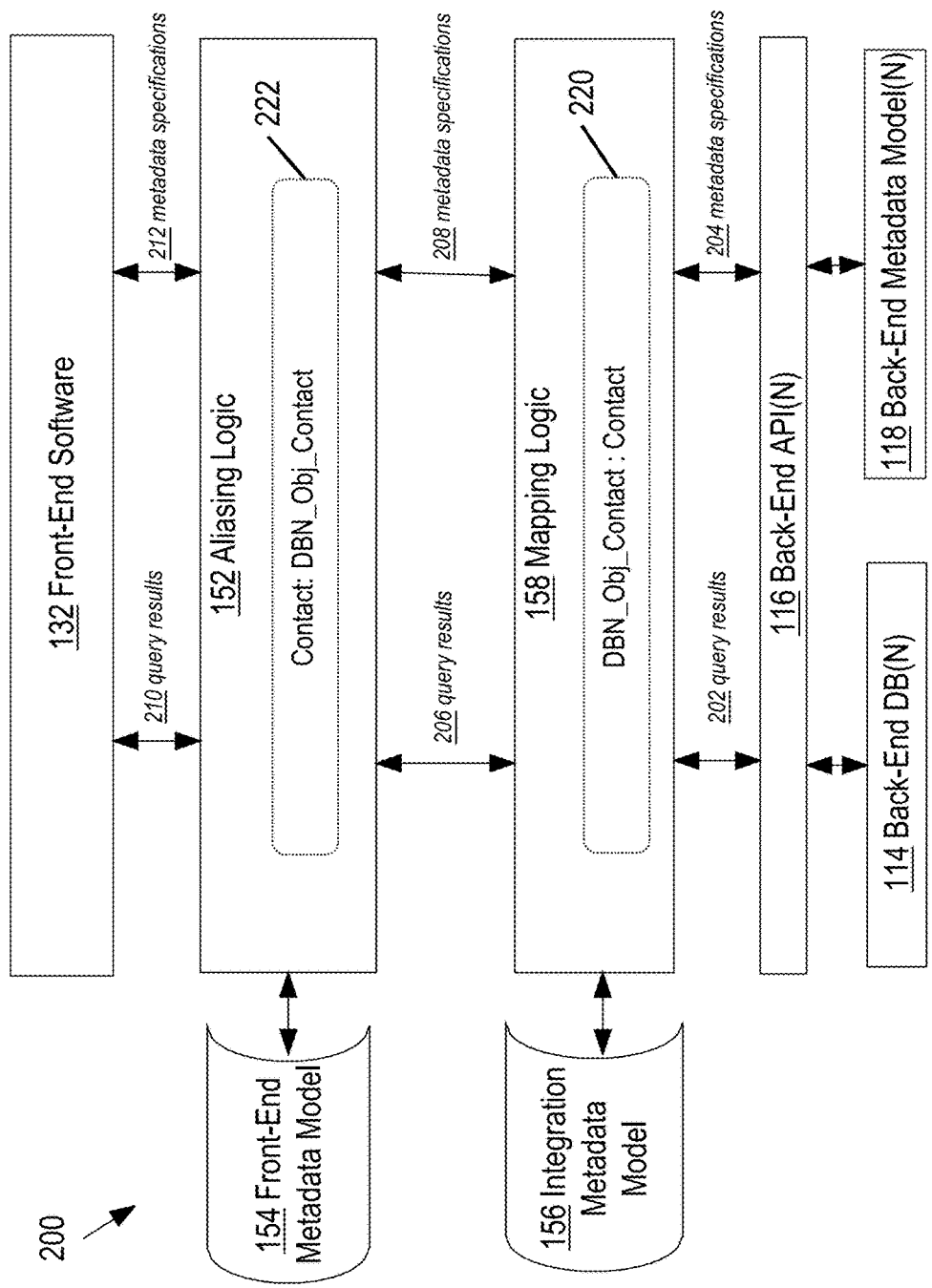
FIG. 2 is block diagram that depicts an example of operation of portions of the system of FIG. 1, in an embodiment.
Figure 3:
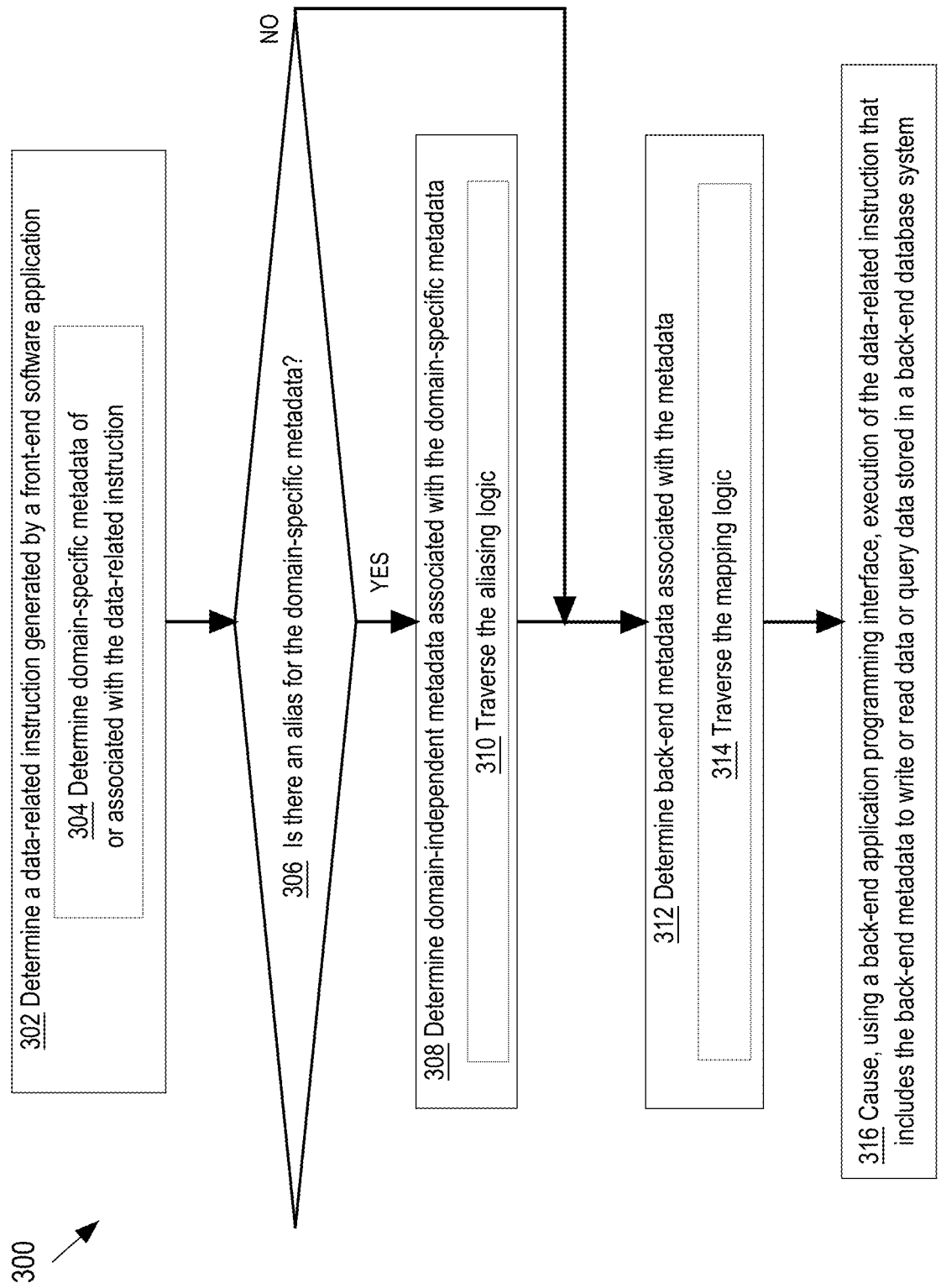
FIG. 3 is a flow diagram that depicts a process for enabling data communication between a front-end software application and a back-end database system, in an embodiment.

FIGS. 2 and 3 illustrate processes that can be performed by computing system 100 using portions of integration API 150. FIG. 2 is block diagram that depicts an example of back-end to front-end data communication operations of portions of the system of FIG. 1, in an embodiment.

When a data related instruction (such as a read, write, or query command) is generated in front-end software 132, the data-related instruction is transformed by integration API 150 into an instruction that can be executed against back-end database 114 using portions of back-end API 116. In response to the data-related instruction, back-end API 116 exposes query results 202, which include data retrieved from back-end database 114, and metadata specifications 204, which include portions of back-end metadata model 118. The structure and contents of query results 202 and metadata specifications 204 are bound to the particular back-end database system 112 being used. For instance, the format of query results 202 and metadata specifications 204 will be different if back-end database system 112 is designed using a relational database paradigm or a REST-centric, graph-based paradigm. Mapping logic 158 can be programmatically configured to recognize different metadata formats associated with the various different back-end database systems 112.

Mapping logic 158 executes rule-based logic, in an embodiment, to translate the back-end query results 202 and metadata specifications 204 into query results 206 and metadata specifications 208, where query results 206 and metadata specifications 208 conform to integration metadata model 156. Integration metadata model 156 is implemented as a domain-independent and/or database paradigm-independent model, in order to facilitate cross-domain and/or cross-database software integration. As an example, mapping logic may translate back end-specific metadata concepts like "SObject" and "Field" (where "SObject" is metadata that describes a data object or table and "Field" is metadata that describes an attribute, field, or property of the data object) into domain-independent and/or back end-agnostic metadata concepts like "record and "field."

Mapping logic 158 may further align the back-end query results 202 and metadata specifications 204 with domain-independent field-level metadata, such as "fieldType," "label," "searchable," in accordance with integration metadata model 156. As a result, portions of back-end database 114 can be accessed and used by front-end software 132 (such as for searching, editing, and building a user interface), even if front-end software 132 does not have knowledge of or access to the particular back-end metadata model 118. Mapping logic 158 may also specify domain-specific or application-specific field-level user interface properties, such as whether a field is required or whether the field is searchable, whether the field has a default value or whether the field value is selected from a pick list.

Metadata 220 is a simplified example of metadata specifications 208, which may be generated by mapping logic 158 performing a transformation on metadata specifications 204, in an embodiment. Example 220 can be read as, Contact is a database record that is driven by (or instantiated by) data that is stored in back-end database 114 and associated with the DBN_Obj_Contact data object of back-end metadata model 118. Additional examples are shown in Table 1 below.

TABLE 1

Example metadata transformations and aliasing using integration API.

| Back-end Metadata model | Mapping Layer | Aliasing Layer |
|---|---|---|
| Amount | fld-Amount | amount |
| Account (example code snippet: "relationshipName: Account") | fldRel-Account | customer |
| CreatedDate (timestamp) | fldDur-CreatedDate (field type = INTEGER) (in this case, mapping logic 158 transforms timestamp data into a duration of time equal to a count of the number of days between the stored timestamp and a current timestamp) | duration |
| OpportunityContactRole | "ocrRelationships" (field type = RELATIONSHIP) (in this example, the RELATIONSHIP field type signifies that the field contains pointers to other records, where those pointers have "types". Also, while "OpportunityContactRole" is not explicitly defined in the integration metadata model, the data in this field is used to populate a field that has a different name in the integration metadata model. | title |
| Entity Property | Record name = "ent-opportunity" Field name = "prop-name" (this example illustrates accommodation of a different database paradigm in the integration metadata model) | opportunity |

Aliasing logic 152 transforms query results 206 and metadata specifications 208 to domain-specific query results 210 and metadata specifications 212. That is, aliasing logic renames and/or reformats data and metadata for the needs of a particular front-end application software 132, in accordance with front-end metadata model 154.

Metadata 222 is a simplified example of metadata specifications 212, which may be generated by aliasing logic 152 performing a transformation on metadata specifications 208, in an embodiment. Example 222 can be read as a renaming of the DBN_Obj_Contact data object as "Contact" so that code can be written for front-end software 132 that utilizes "Contact" data without needing to have knowledge of or reference the particular back-end metadata model 118.

The transformations performed by aliasing logic 152 can incorporate domain-specific knowledge by, for example, aliasing names that can be easily recognized by programming languages typically used to build front-end software 132, and by supplying domain-specific labels and rules for use in presenting and/or inputting data in a user interface of front-end software 132. For example, aliasing logic 152 may specify lower-case alias names that may conform to naming conventions of well-known domain-specific concepts such as may be specified in a reference vocabulary or dictionary.

Integration API 150 typically does not contain record-level and field-level mappings for each and every field that is represented in back-end metadata model 118. Field names specified by mapping logic 158 can be used when no alias is provided by aliasing logic 152. In either case the field is still usable, even if no alias or mapping is defined. Alternatively, a field that is represented in back-end metadata model 118 can be aliased by aliasing logic 152 for a domain-specific use in front-end software application 132, even if no counterpart exists in integration metadata model 156 (however, in that case, the alias will not appear in the front-end metadata model 154).

In other words, either mapping logic 158 or aliasing logic 152 can be selectively engaged or bypassed, depending on the presence or absence of relevant entries in front-end metadata model 154 and integration metadata model 156. This decoupling or independent operation of aliasing logic 152 and mapping logic 158 can facilitate the propagation of changes to back-end metadata model 118 without affecting front-end software 132 and also can enable changes to front-end application software 132 that include references to particular metadata to be enabled for previously-existing references to the affected metadata. Examples of these advantages are described below with reference to FIGS. 4A and 4B. While the descriptions of FIGS. 2 and 3 focus on explaining approaches to retrieving data from back-end database 114 using integration API 150, it will be understood by those skilled in the art that similar approaches are used, in the reverse manner, to write data to back-end database 114 using integration API 150.

FIG. 3 is a flow diagram that depicts a process for enabling data communication between a front-end software application and a back-end database system, in an embodiment. Process 300 may be performed by a single entity or program or by multiple entities or programs, including for example a browser plug-in and a remote server. The operations of the process as shown in FIG. 3 can be implemented using processor-executable instructions that are stored in computer memory. For purposes of providing a clear example, the operations of FIG. 3 are described as performed by computing device(s) 110, 140, 142, which may be individually or collectively referred to as simply 'computing system 100.'

In operation 302, computing system 100 determines a data-related instruction generated by a front-end software application. A data-related instruction may include a read, write, or query instruction issued by the front-end software application. The data-related instruction may be generated in response to a human-interaction with a user interface of the front-end software application. As part of operation 302, computing system 100 may, in operation 304, determine domain-specific metadata included in or associated with the data-related instruction. For example, operation 304 may incorporate metadata extracted from the query into the search command, or operation 304 may reference front-end metadata model 154 to determine metadata associated with the data-related instruction.

In operation 306, computing system 100 determines whether an alias exists for the front-end metadata determined in operation 302 and/or operation 304. To do this, computing system 100 executes aliasing logic to determine whether the front-end metadata has an association with a corresponding metadata definition in integration metadata model 156. If no alias exists, computing system 100 proceeds to operation 314 without performing any aliasing. If there is an alias, computing system 100 proceeds to operation 308 using the alias.

In operation 308, computing system 100 determines domain-independent metadata (for example, metadata in integration metadata model 156) that is associated with the alias identified in operation 306. To do this, computing system 100 traverses the aliasing logic in operation 310. Examples of associations between front-end metadata and integration metadata are described above and shown in Table 1.

In operation 312, computing system 100 determines a mapping, for the domain-independent metadata determined in operations 308, 310 or the domain-specific metadata determined in operations 302, 304, to back-end metadata. To do this, computing system 100 traverses mapping logic, in operation 314, to determine an association between the metadata (domain-specific metadata or domain-independent metadata, as the case may be) and corresponding back-end metadata in a back-end metadata model. Examples of associations between domain-independent metadata and back-end metadata are described above and shown in Table 1.

In operation 316, computing system 100 causes executing of the data-related instruction determined in operation 302, using a back-end API (such as a portion of back-end API 116) and the back-end metadata determined in operations 312, 314. As noted above, results of executing the data-related instruction are communicated back to the front-end software using a similar set of operations in the reverse direction (for example, determine domain-independent metadata associated with back-end metadata, then determine domain-specific metadata associated with domain-independent metadata).

Use Case: Adding a Customization to Back-End System

As a specific example, FIG. 4A is a screen capture 400A of a user interface that may be displayed by front-end software 132 when a data-related instruction generated by a front-end software application is executed by a back-end database system. Screen capture 400A is a tabular display of data retrieved from one or more back-end database systems using an integration API as described above. Each row of the display corresponds to a data record (or instance of an "Opportunity" data object or entity) and each column of the tabular display corresponds to a field of the data record. One or more of field names 402, 404, 406, 408 may be domain-specific labels which are determined by computing system 100 traversing aliasing logic as described above. One or more of the field names 402, 404, 406, 408 may be domain-independent labels which are determined by computing system 100 traversing mapping logic as described above.

For example, "Competitor" 408 may represent a data field that was added to back-end metadata model as a post-implementation customization. Updating the mapping layer of the integration API to include a reference to the new data field exposes the customization for use by the front-end software without the front-end software needing to know the details of the back-end system supporting the customization. If there is no need for the front-end software to execute any functionality using the custom data field, then front-end software may simply retrieve and display the data stored in the custom data field, as shown in screen capture 400A.

Use Case: Adding a New Feature to Front-End Software

As another specific example, FIG. 4B is a screen capture of an example of a modification of the user interface of FIG. 4A to include an additional feature, in an embodiment. Screen capture 400B displays data retrieved from one or more back-end database systems, in an embodiment. Screen capture 400B is similar to screen capture 400A, except that screen capture 400B displays a new feature 410 that has been implemented in the front-end software application after an initial implementation of the back-end system. The new feature 410 includes a pop-up graphical element that displays recent news about the competitor "C1 Co." identified in row 1, column 5 of the tabular display. More specifically, the new feature uses the competitor data value obtained via integration API to execute a query on a back-end system to look for recent news items that mention "C1 Co.," and displays a notification if a news item is found. Whereas in the version of the front-end software of screen capture 400A, no alias was associated with "Competitor" in the integration API because the front-end software did not need to code against the Competitor field, now, in the newer version of the front-end software of screen capture 400B, an alias has been created, which enables the front-end software to effectively apply the new feature 410 to the previously-stored instances of data referenced by the Competitor field, without requiring any modifications to the back-end system and without impacting references that are expressed in the integration API 150.

More generally, the mapping component of the integration API is used for data communication with the back-end system and the aliasing component of the integration API is used for data communication with the front-end software. As a result, only the front-end software and not the back-end system is affected by changes made to the aliasing component and likewise, only the back-end system and not the front-end software is affected by changes made to the mapping component. Stated another way, the aliasing component and the mapping component cooperate so that modifications to front-end software are constrained to the aliasing component and modifications to back-end database schema are constrained to the mapping component.

Benefits that may be realized by at least some embodiments described herein include improved interoperability between front-end software and customized back-end systems and/or customized front-end software and back-end databases. These improvements can, among other things, improve the robustness of both the front-end software and the back-end databases.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
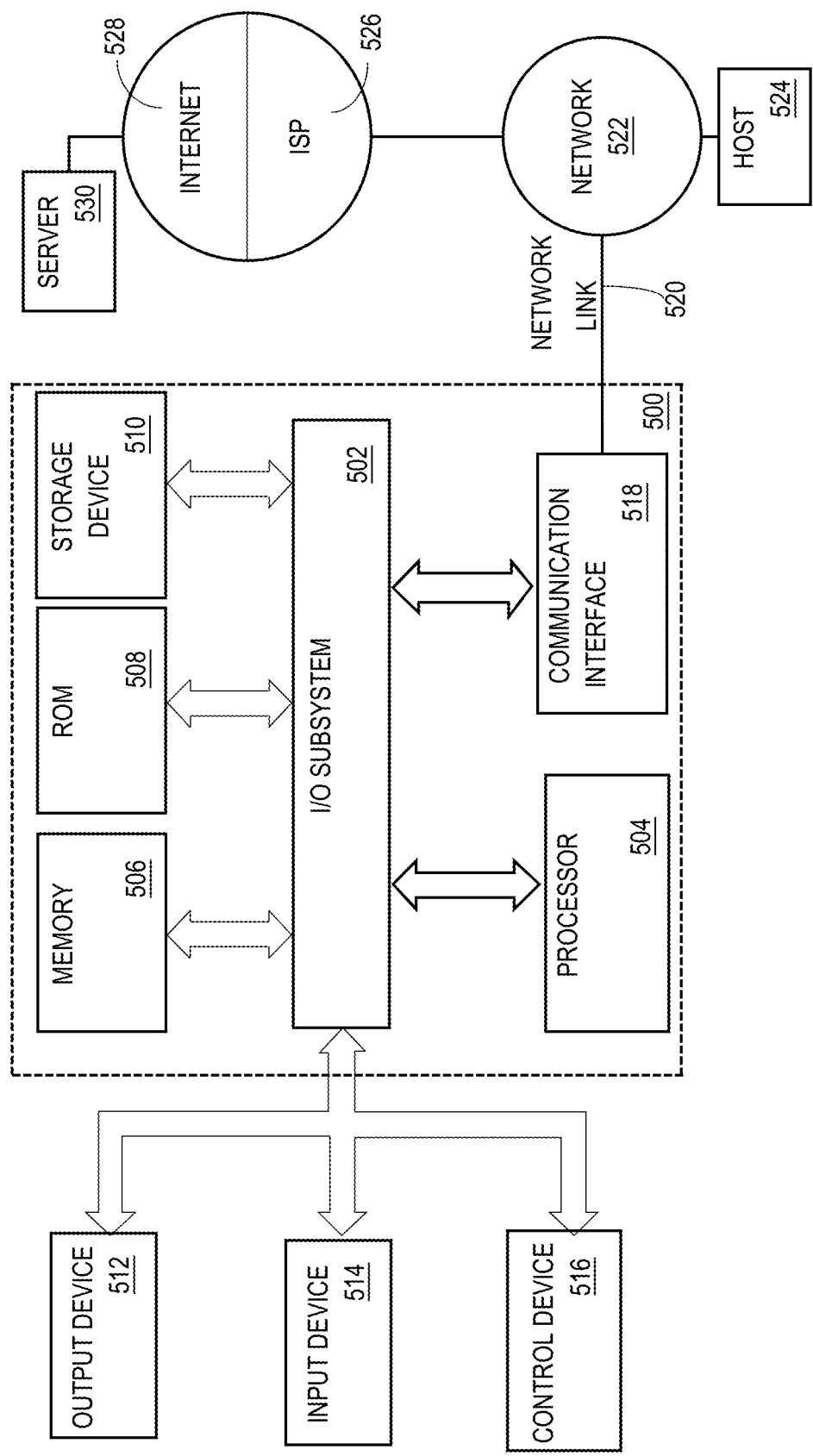
FIG. 5 is a block diagram that illustrates a computer system upon which an embodiment of the present invention may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504.

The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples described below.

In an example 1, a method includes, in response to a data-related instruction generated by a front-end software application, using a domain-specific aliasing component of an integration application programming interface, determining domain-independent metadata associated with domain-specific metadata of the data-related instruction; using a domain-independent mapping component of the integration application programming interface, determining back-end metadata associated with the domain-independent metadata; causing, using a back-end application programming interface, execution of the data-related instruction that includes the back-end metadata to write or read data or query data stored in a back-end database system, wherein the method is performed by one or more computing devices.

An example 2 includes the subject matter of example 1, and includes, using the domain-independent mapping component of the integration application programming interface, determining that the back-end metadata associated with the domain-independent metadata comprises custom metadata that has been added to the back-end database system; causing execution, on the back-end database system, of the data-related instruction that includes the custom metadata; using the integration application programming interface, causing display of a result of executing the data-related instruction including the custom metadata in the front-end software application.

An example 3 includes the subject matter of example 1 or example 2, and includes, in response to determining that the back-end database system comprises custom metadata, adding domain-independent metadata that is associated with the custom metadata to the domain-independent mapping component; using the domain-independent mapping component to cause reading or writing or querying data stored in the back-end database system.

An example 4 includes the subject matter of example 1 or example 2, and includes, in response to determining that a custom metadata item has been added to the back-end database system, adding a domain-independent metadata item associated with the custom metadata item to the domain-independent mapping component without modifying the front-end software application.

An example 5 includes the subject matter of example 1 or example 2, wherein the back-end database system is one of a plurality of heterogeneous back-end database systems that are communicatively couplable to the front-end software application, wherein the domain-independent mapping component comprises a domain-independent metadata item associated with each of the plurality of heterogeneous back-end database systems.

An example 6 includes the subject matter of example 1 or example 2, and includes, in response to determining that a new feature has been added to the front-end software application, adding, to the domain-specific aliasing component without modifying the domain-independent mapping component, a domain-specific metadata item associated with a back-end specific metadata item used by the new feature.

An example 7 includes the subject matter of example 1 or example 2, and includes modifying an association between domain-specific metadata and back-end metadata by modifying the domain-specific aliasing component or by modifying the domain-independent mapping component.

In an example 8, a method includes, in response to a data-related instruction generated by a front-end software application communicatively coupled to a customer relationship management (CRM) system, determining domain-specific metadata associated with the data-related instruction; using a domain-specific aliasing component of an integration application programming interface, determining domain-independent metadata associated with the domain-specific metadata; using a domain-independent mapping component of the integration application programming interface, determining CRM metadata associated with the domain-independent metadata; causing, using a CRM application programming interface, execution of the data-related instruction that includes the CRM metadata to write data or read or query data stored in the CRM system.

An example 9 includes the subject matter of example 8, and includes, using the domain-independent mapping component of the integration application programming interface, determining that the CRM metadata associated with the domain-independent metadata comprises custom metadata that has been added to the CRM system; causing execution of the data-related instruction including the custom metadata on the CRM system; using an interface specification associated with the domain-specific metadata, causing display of a result of executing the data instructions including the custom metadata in the front-end software application.

An example 10 includes the subject matter of example 8 or example 9, and includes, in response to determining that the CRM system comprises custom metadata, adding domain-independent metadata that is associated with the custom metadata to the domain-independent mapping component; using the domain-independent mapping component to cause reading or writing or querying data stored in the CRM system.

An example 11 includes the subject matter of example 8 or example 9, and includes, in response to determining that a custom metadata item has been added to the CRM system, adding a domain-independent metadata item associated with the custom metadata item to the domain-independent mapping component without modifying the domain-specific aliasing component.

An example 12 includes the subject matter of example 8 or example 9, wherein the CRM system is one of a plurality of heterogeneous CRM systems that are communicatively couplable to the front-end software application, the domain-independent mapping component comprises a plurality of domain-independent metadata items that are associated with the plurality of CRM systems.

An example 13 includes the subject matter of example 8 or example 9, and includes, in response to determining that a new feature has been added to the front-end software application, adding a domain-specific metadata item associated with a CRM metadata item used by the new feature to the domain-specific aliasing component without modifying the domain-independent mapping component.

An example 14 includes the subject matter of example 8 or example 9, and includes modifying an association between domain-specific metadata and CRM metadata by modifying the domain-specific aliasing component without modifying the domain-independent mapping component of the integration application programming interface.

In an example 15, one or more non-transitory computer-readable storage media includes instructions which, when executed by one or more processors, cause, in response to a data-related instruction generated by a front-end software application, using a domain-specific aliasing component of an integration application programming interface, determining domain-independent metadata associated with domain-specific metadata of the data-related instruction; using a domain-independent mapping component of the integration application programming interface, determining back-end metadata associated with the domain-independent metadata; causing, using a back-end application programming interface, execution of the data-related instruction that includes the back-end metadata to write or read data or query data stored in a back-end database system.

An example 16 includes the subject matter of example 15, wherein the instructions, when executed by the one or more processors, further cause using the domain-independent mapping component of the integration application programming interface, determining that the back-end metadata associated with the domain-independent metadata comprises custom metadata that has been added to the back-end database system; causing execution, on the back-end database system, of the data-related instruction that includes the custom metadata; using the integration application programming interface, causing display of a result of executing the data-related instruction including the custom metadata in the front-end software application.

An example 17 includes the subject matter of example 15 or example 16, wherein the instructions, when executed by the one or more processors, further cause, in response to determining that the back-end database system comprises custom metadata, adding domain-independent metadata that is associated with the custom metadata to the domain-independent mapping component; using the domain-independent mapping component to cause reading or writing or querying data stored in the back-end database system.

An example 18 includes the subject matter of example 15 or example 16, wherein the instructions, when executed by the one or more processors, further cause, in response to determining that a custom metadata item has been added to the back-end database system, adding a domain-independent metadata item associated with the custom metadata item to the domain-independent mapping component without modifying the front-end software application.

An example 19 includes the subject matter of example 15 or example 16, wherein the back-end database system is one of a plurality of heterogeneous back-end database systems that are communicatively couplable to the front-end software application, wherein the domain-independent mapping component comprises a domain-independent metadata item associated with each of the plurality of heterogeneous back-end database systems.

An example 20 includes the subject matter of example 15 or example 16, wherein the instructions, when executed by the one or more processors, further cause modifying an association between domain-specific metadata and back-end metadata by modifying the domain-specific aliasing component or by modifying the domain-independent mapping component.

GENERAL CONSIDERATIONS

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system, comprising:
   one or more processors;
   one or more storage media storing instructions which, when executed by the one or more processors, cause, using connection graph data that represents connections between nodes in a connection network, the one or more processors to perform operations comprising:

in response to a data-related instruction generated by a front-end software application communicatively coupled to a customer relationship management (CRM) system, determining domain-specific metadata associated with the data-related instruction;

using a domain-specific aliasing component of an integration application programming interface, determining domain-independent metadata associated with the domain-specific metadata;

using a domain-independent mapping component of the integration application programming interface, determining CRM metadata associated with the domain-independent metadata;

causing, using a CRM application programming interface, execution of the data-related instruction that includes the CRM metadata to at least one of: (i) write data to the CRM system, (ii) read data stored in the CRM system, (iii) query data stored in the CRM system, or (iv) any one or more of (i), (ii), (iii).

2. The system of claim 1, wherein the instructions, when executed by the one or more processors, further cause:

using the domain-independent mapping component of the integration application programming interface, determining that the CRM metadata associated with the domain-independent metadata comprises custom metadata that has been added to the CRM system;

executing the data-related instruction including the custom metadata on the CRM system;

using an interface specification associated with the domain-specific metadata, causing display of a result of executing the data-related instruction including the custom metadata in the front-end software application.

3. The system of claim 1, wherein the instructions, when executed by the one or more processors, further cause:

in response to determining that the CRM system comprises custom metadata, adding domain-independent metadata that is associated with the custom metadata to the domain-independent mapping component; using the domain-independent mapping component to cause reading or writing or querying data stored in the CRM system.

4. The system of claim 1, wherein the instructions, when executed by the one or more processors, further cause:

in response to determining that a custom metadata item has been added to the CRM system, adding a domain-independent metadata item associated with the custom metadata item to the domain-independent mapping component without modifying the domain-specific aliasing component.

5. The system of claim 1, wherein the CRM system is one of a plurality of heterogeneous CRM systems that are communicatively couplable to the front-end software application, the domain-independent mapping component comprises a plurality of domain-independent metadata items that are associated with the plurality of CRM systems.

6. The system of claim 1, wherein the instructions, when executed by the one or more processors, further cause:

in response to determining that a new feature has been added to the front-end software application, adding a domain-specific metadata item associated with a CRM metadata item used by the new feature to the domain-specific aliasing component without modifying the domain-independent mapping component.

7. The system of claim 1, wherein the instructions, when executed by the one or more processors, further cause:

modifying an association between domain-specific metadata and CRM metadata by modifying the domain-specific aliasing component without modifying the domain-independent mapping component of the integration application programming interface.

8. A method, comprising:

in response to a data-related instruction generated by a front-end software application, using a domain-specific aliasing component of an integration application programming interface, determining domain-independent metadata associated with domain-specific metadata of the data-related instruction;

using a domain-independent mapping component of the integration application programming interface, determining back-end metadata associated with the domain-independent metadata;

causing, using a back-end application programming interface, execution of the data-related instruction that includes the back-end metadata to at least one of: (i) write data to a back-end database system, (ii) read data stored in the back-end database system, (iii) query data stored in the back-end database system, or (iv) any one or more of (i), (ii), (iii), wherein the method is performed by one or more computing devices.

9. The method of claim 8, comprising:

using the domain-independent mapping component of the integration application programming interface, determining that the back-end metadata associated with the domain-independent metadata comprises custom metadata that has been added to the back-end database system;

causing execution, on the back-end database system, of the data-related instruction that includes the custom metadata;

using the integration application programming interface, causing display of a result of executing the data-related instruction including the custom metadata in the front-end software application.

10. The method of claim 8, comprising:

in response to determining that the back-end database system comprises custom metadata, adding domain-independent metadata that is associated with the custom metadata to the domain-independent mapping component;

using the domain-independent mapping component to cause reading or writing or querying data stored in the back-end database system.

11. The method of claim 8, comprising:

in response to determining that a custom metadata item has been added to the back-end database system, adding a domain-independent metadata item associated with the custom metadata item to the domain-independent mapping component without modifying the front-end software application.

12. The method of claim 8, wherein the back-end database system is one of a plurality of heterogeneous back-end database systems that are communicatively couplable to the front-end software application, wherein the domain-independent mapping component comprises a domain-independent metadata item associated with each of the plurality of heterogeneous back-end database systems.

13. The method of claim 8, comprising:

in response to determining that a new feature has been added to the front-end software application, adding, to the domain-specific aliasing component without modifying the domain-independent mapping component, a domain-specific metadata item associated with a back-end specific metadata item used by the new feature.

14. The method of claim 8, comprising:
modifying an association between domain-specific metadata and back-end metadata by modifying the domain-specific aliasing component or by modifying the domain-independent mapping component.

15. One or more non-transitory computer-readable storage media comprising instructions which, when executed by one or more processors, cause:
   in response to a data-related instruction generated by a front-end software application, using a domain-specific aliasing component of an integration application programming interface, determining domain-independent metadata associated with domain-specific metadata of the data-related instruction;
   using a domain-independent mapping component of the integration application programming interface, determining back-end metadata associated with the domain-independent metadata;
   causing, using a back-end application programming interface, execution of the data-related instruction that includes the back-end metadata to at least one of: (i) write data to a back-end database system, (ii) read data stored in the back-end database system, (iii) query data stored in the back-end database system, or (iv) any one or more of (i), (ii), (iii).

16. The one or more non-transitory computer-readable storage media of claim 15, wherein the instructions, when executed by the one or more processors, further cause:
   using the domain-independent mapping component of the integration application programming interface, determining that the back-end metadata associated with the domain-independent metadata comprises custom metadata that has been added to the back-end database system;
   causing execution, on the back-end database system, of the data-related instruction that includes the custom metadata;
   using the integration application programming interface, cause representing a result of executing the data-related instruction including the custom metadata in the front-end software application.

17. The one or more non-transitory computer-readable storage media of claim 15, wherein the instructions, when executed by the one or more processors, further cause:
   in response to determining that the back-end database system comprises custom metadata, adding domain-independent metadata that is associated with the custom metadata to the domain-independent mapping component;
   using the domain-independent mapping component to cause reading or writing or querying data stored in the back-end database system.

18. The one or more non-transitory computer-readable storage media of claim 15, wherein the instructions, when executed by the one or more processors, further cause:
   in response to determining that a custom metadata item has been added to the back-end database system, adding a domain-independent metadata item associated with the custom metadata item to the domain-independent mapping component without modifying the front-end software application.

19. The one or more non-transitory computer-readable storage media of claim 15, wherein the back-end database system is one of a plurality of heterogeneous back-end database systems that are communicatively couplable to the front-end software application, wherein the domain-independent mapping component comprises a domain-independent metadata item associated with each of the plurality of heterogeneous back-end database systems.

20. The one or more non-transitory computer-readable storage media of claim 15, wherein the instructions, when executed by the one or more processors, further cause:
   modifying an association between domain-specific metadata and back-end metadata by modifying the domain-specific aliasing component or by modifying the domain-independent mapping component.

* * * * *